United States Patent [19]
Cyras et al.

[11] Patent Number: 5,889,866
[45] Date of Patent: *Mar. 30, 1999

[54] METHOD AND APPARATUS FOR CONTROLLING ACCESS TO DETACHABLY CONNECTABLE COMPUTER DEVICES USING AN ENCRYPTED PASSWORD

[75] Inventors: Gary Cyras, Folsom, Calif.; Stuart Levy, Phoenix, Ariz.; David C. Scheer, Boca Raton, Fla.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 655,159

[22] Filed: May 29, 1996

Related U.S. Application Data

[63] Continuation of Ser. No. 269,206, Jun. 30, 1994, abandoned.

[51] Int. Cl.⁶ ................................................. G06F 13/12
[52] U.S. Cl. ............................................. 380/49; 380/25
[58] Field of Search .................................. 380/25, 4, 49; 395/187.01

[56] References Cited

U.S. PATENT DOCUMENTS

| | | |
|---|---|---|
| Re. 34,369 | 9/1993 | Darden et al. . |
| 4,530,069 | 7/1985 | Desrochers . |
| 4,695,925 | 9/1987 | Kodai et al. . |
| 4,786,900 | 11/1988 | Karasawa et al. ................. 340/825.31 |
| 4,811,165 | 3/1989 | Currier et al. . |
| 4,951,280 | 8/1990 | McCool et al. . |
| 5,183,404 | 2/1993 | Aldous et al. . |
| 5,184,282 | 2/1993 | Kaneda et al. . |
| 5,187,352 | 2/1993 | Blair et al. ............................... 235/382 |
| 5,207,586 | 5/1993 | MacGregor et al. . |
| 5,272,477 | 12/1993 | Tashima et al. . |
| 5,278,730 | 1/1994 | Kikinis ..................................... 361/686 |
| 5,282,247 | 1/1994 | McLean et al. ............................. 380/4 |
| 5,285,057 | 2/1994 | Murohara . |
| 5,296,692 | 3/1994 | Shino . |
| 5,296,850 | 3/1994 | King . |
| 5,303,121 | 4/1994 | Thornberg . |
| 5,313,364 | 5/1994 | Omori et al. . |
| 5,357,573 | 10/1994 | Walters ..................................... 380/25 |
| 5,406,624 | 4/1995 | Tulpan ....................................... 380/4 |
| 5,434,562 | 7/1995 | Reardon ............................. 340/825.34 |
| 5,623,637 | 4/1997 | Jones et al. .............................. 395/491 |

OTHER PUBLICATIONS

Evans, Jr et al, "A User Authentication Scheme Not Requiring Secrecy in The Computer," Comm. of the ACM, Aug. 1974 Vol. 17, No. 8, pp. 437–442.

No Author, *PCMCIA, Personal Computer Memory Card International Assosiation PC Card Standard Release 2.0* 3–13 through 3–26 (Sep. 1991).

No Author, *Miu Industries Ltd.,* Company Overview pp. 1 through 3 (1994).

No Author, *PCMCIA, Recommended Extensions, Release 1.00,* 1–3 through 1–8 (1992).

No Author, *The Session Key Data Security Solution,* Company Brochure.

*Primary Examiner*—Gilberto Barron, Jr.
*Attorney, Agent, or Firm*—Blakely, Sokoloff, Taylor & Zafman LLP

[57] ABSTRACT

A method and apparatus for controlling access to a detachably connectable computer device using encryption is disclosed. The method and apparatus include a connector for coupling the device to a computer, an input for receiving a password from a user, encrypting logic for encrypting the password and comparing logic for comparing the received password with a key. The key is determined by encrypting a user-assigned password and storing it as the key. Further included is circuitry for determining whether the received password corresponds to the key, and circuitry for sending an enable signal to configuration logic of the detachably connectable computer device, upon a determination that the received password corresponds to the key.

15 Claims, 5 Drawing Sheets

METHOD AND APPARATUS FOR CONTROLLING ACCESS TO DETACHABLY CONNECTABLE COMPUTER DEVICES USING AN ENCRYPTED PASSWORD

This a continuation of application Ser. No. 08/269,206, filed Jun. 30, 1994, now abandoned.

FIELD OF THE INVENTION

The present invention relates to the field of detachably connectable computer devices; particularly, the present invention relates to a method and apparatus for controlling access to detachably connectable computer devices using an encrypted password.

BACKGROUND OF THE INVENTION

Modern personal computers are, in many cases, more modular and can accommodate more add-on features than their predecessors. Detachable battery packs, mice, modems and keyboards, user-installable add-on cards, and processors and removable disk drives have all become common features of computer systems today.

With this modularity and the detachably connectable nature of many of these add-on devices, theft has become a problem. Because these detachably connectable devices are relatively easy to carry away and they are often designed to work with a variety of different computers, they are frequent targets for theft and misuse.

The field of laptop and notebook computers provides a good example of this problem. In the field of laptop and notebook computers, the demand for portability and functionality of components continues to play a powerful role. Consumers require small, lightweight components with functional capabilities rivaling those of traditional, stationary counterparts.

Especially important to portable computers are peripheral input/output devices such as modems, facsimile machines, local area networks (LANs), and memories. A modem, for example, allows a user to communicate with other computers over telephone lines. Such a modem may provide access to data at a base office from a portable computer without the need for storing that data in the portable computer.

A portable computer device, such as a modem, is often arranged on an internal board within the portable computer. Some portable computer configurations provide separate devices which may be carried by a user and attached to the portable computer when needed. Some peripheral devices, such as modems, have been designed to plug directly into sockets recessed within the body of the portable computer. Traditionally, a portable computer includes a separate socket and separate internal circuitry for each peripheral device. This requires extra space in the internal circuitry of the portable computer.

A modern portable computer, however, may have one or more sockets, each being able to accept a variety of peripheral devices. For example, a single socket on a portable computer may be able to interface with a modem, facsimile machine, LAN, and/or an external memory. Such a configuration obviously reduces the amount of space required within the computer.

In September of 1991, Personal Computer Memory Card International Association (PCMCIA), jointly with the Japan Electronics Industry Development Association (JEIDA), introduced an international standard, which defines the physical and electrical interface specifications for the interchangeability of memory and input/output cards. The assignee of the present invention, Intel Corporation, has additionally issued, on Dec. 20, 1991, a specification referred to as an Exchangeable Card Architecture (ExCA™) specification. (ExCA is a trademark of Intel Corporation.) The ExCA specification describes interfaces which allow memory and input/output cards for portable personal computers of different manufacturers to be interchanged.

An integrated circuit card as referred to in this specification is an electronic device that is adapted for use with a personal computer and that generally is capable of performing one or more specific functions such as providing increased hard disk storage, providing local area network (LAN) communications or providing facsimile transmission and receipt capabilities. A card built to the PCMCIA standard is just one example of an integrated circuit card as described in the present invention. It will be apparent to one of ordinary skill in the art, however, that IC cards, modules and boxes that do not comply with the PCMCIA standard may also be used with the present invention.

An integrated circuit (IC) card designed and manufactured according to the PCMCIA specification, has a sixty-eight pin connector located at one end of the card for the sending and receiving of signals by the card. The IC card can be placed within a recessed socket within the computer, for example, to protect the card with the body of the computer surrounding the interface circuitry. Each IC card can be connected, used, and removed from a socket, interchangeably with other IC cards.

Along with the convenience and enhanced functionality of these IC cards lies a security problem. As discussed above, because of their small size, IC cards can be easily borrowed or stolen and the rising theft of IC cards has thus become a problem among users. Various approaches have arisen to combat this problem.

A first approach to the problem of theft of IC cards is to install a mechanical type of restraint. This approach is cumbersome to users in that it involves additional equipment where a goal of portable computing is to make computers and peripherals as small and lightweight as possible.

Another solution applies only to IC cards which provide external data storage, such as an IC card with a solid-state hard drive or an IC card with a rotating-disk hard drive installed thereon. According to this approach, data compression and/or data encryption onto the IC card hard drive is performed in such a way that data on the IC card's drive is useless to anyone without the same encryption or compression/decompression software. The thief is thus prevented from using the IC card only to the extent of reading pre-existing data on the disk. This second approach protects from unauthorized access to data on the IC card, but does not prevent unauthorized use of the IC card itself.

A third approach is similar to the second approach in that data is written on a hard drive using encryption techniques. Unlike the second approach, however, this third approach allows the IC card to encrypt data onto the system hard drive, which is built into the computer. Thus, the IC card acts as a security key. Without the particular IC card which directed the encryption, a user may not access the data on the system hard drive. Under this configuration, data placed on the system hard drive without the IC card encryption technique is unaffected, and only data encrypted by the IC card is protected. As with the second approach, this configuration does not prevent unauthorized use of the IC card itself, but only prevents unauthorized access to data encrypted by the IC card and stored on a system hard drive.

Similar issues exist with other detachably connectable computer devices.

Thus, a more convenient and comprehensive means for providing security for detachably connectable computer devices is needed.

SUMMARY OF THE INVENTION

The present invention is a software-activated security system that renders unauthorized detachably connectable computer devices useless to users who do not have the proper password. Additionally, the present invention is capable of disabling critical device functions such as fax/modem or private network access, and can prevent access to input/output devices, which might contain software for an on-line information service, for example, when the proper password is not supplied upon request. The present invention thus provides a strong deterrent to theft and unauthorized use of these devices.

The present invention is directed to controlling the operability of detachably connectable computer devices adapted for operation with a personal computer. The personal computer has a coupling for connecting these devices to the personal computer, an output device or display for displaying a prompt to the user and a keyboard or other input device which enables the user to respond to displayed prompts.

A detachably connectable computer device according to the present invention includes a binary "key". The key comprises a sequence of binary digits stored on the device. In the preferred embodiment, this key is set to all zeros when the device is manufactured. When the device is initially coupled to the computer, the fact that the key is all zeros indicates that a password has not yet been assigned to the device. In alternative embodiments, the key may be any sequence of binary digits.

The detachably connectable computer device further includes encryption logic for encrypting a password. The encryption logic of the preferred embodiment can be implemented in either software or hardware.

The present invention further includes utility software that is shipped with the device and may be either stored on the device itself or provided separately for installation on the computer system. The utility software includes a user interface which displays prompts on the computer system monitor or other output device, requesting user input for password assignment, password entry, and other user-controllable features of the present invention.

When the device is first coupled with the personal computer, a prompt is displayed requesting the user to assign a password to the device. After the user enters his or her password, the encryption logic of the present invention encrypts the entered password and stores the encrypted password as the key on the device, overwriting the key previously stored on the device.

Upon the user's input via the keyboard or other input device and in subsequent use of the detachably connectable computer device, the personal computer display shows a second prompt, which requests the user to enter the assigned password in order to enable operation of the device. After the user reenters the password using the keyboard or other input device, the encryption logic of the present invention encrypts the entered password and compares the result with the key stored on the device. If the encrypted, entered password is the same as the key, and thus, the entered password is the same as the assigned password, an enable signal is sent to configuration logic of the device. This configuration logic may be implemented in either hardware or software. After the enable signal is received, the device is capable of being operated.

If the entered password does not correspond to the assigned password, the device is not enabled, and the user will be unable to access any functionality of the device or any data contained thereon.

Additionally, the present invention provides for the implementation of other theft deterrent features. For example, if, after a pre-determined number of attempts, the user does not enter the correct password, the detachably connectable computer device may sound an alarm or permanently disable access to data or some other such security measure may be taken. The device user is also able to vary the number of password entry attempts allowed before security measures are taken.

It is therefore an object of the present invention to provide a method and apparatus for controlling access to detachably connectable computer devices using encryption. It is a further object of the present invention to enable a user of detachably connectable computer devices to assign a password to such a device. It is a further object of the present invention to encrypt the assigned password of the present invention before storing it on a detachably connectable computer device so that it can not be easily detected by someone other than the rightful user. It is a further object of the present invention to prevent operation of a detachably connectable computer device unless the user-assigned password is entered. It is a further object of the present invention to enable operation of a detachably connectable computer device based on input of the proper password. It is a further object of the present invention to enable users to change the assigned password when desired after first entering the previously assigned password. It is a further object of the present invention to allow users, after entering the assigned password, to increase or decrease the security measures. It is a further object of the present invention to take additional security measures, such as permanently disabling access to data on the device after a pre-determined number of unsuccessful password entry attempts, in order to prevent unauthorized users from using anti-password software to gain access to the device. It is a further object of the present invention to allow the device user to vary the number of password entry attempts allowed before additional security measures are taken. These and other objects of the present invention will be described below in the detailed description of the preferred embodiment of the present invention.

DETAILED DESCRIPTION OF THE PRESENT INVENTION

A method and apparatus for controlling access to detachably connectable computer devices using encryption are now described. Although the preferred embodiment is described with reference to an IC card, and more particularly, an IC card constructed according to the Personal Memory Card International Association (PCMCIA) specification or the Japan Electronics Industry Development Association (JEIDA) specification, this should not be taken to limit the scope of the present invention as recited in the attached claims. Other detachably connectable computer components such as diskettes, cursor control devices, and disk drives are comprehended in the scope of the present invention as well.

In the following description, numerous specific details are set forth, such as specific IC card devices, types of contacts, sizes of buses, and types of signals, in order to provide a thorough understanding of the present invention. It will be apparent, however, to one of ordinary skill in the art that the present invention may be practiced without these specific details. In other instances, well known structures and devices have not been shown or described in detail in order to avoid unnecessarily obscuring the present invention.

The preferred embodiment, which is incorporated into a battery-powered portable computer system such as a laptop or notebook, is described below. The present invention, however, may be incorporated into virtually any processor-based system design, and is not intended to be limited to the below particular computer system.

Figure 1:
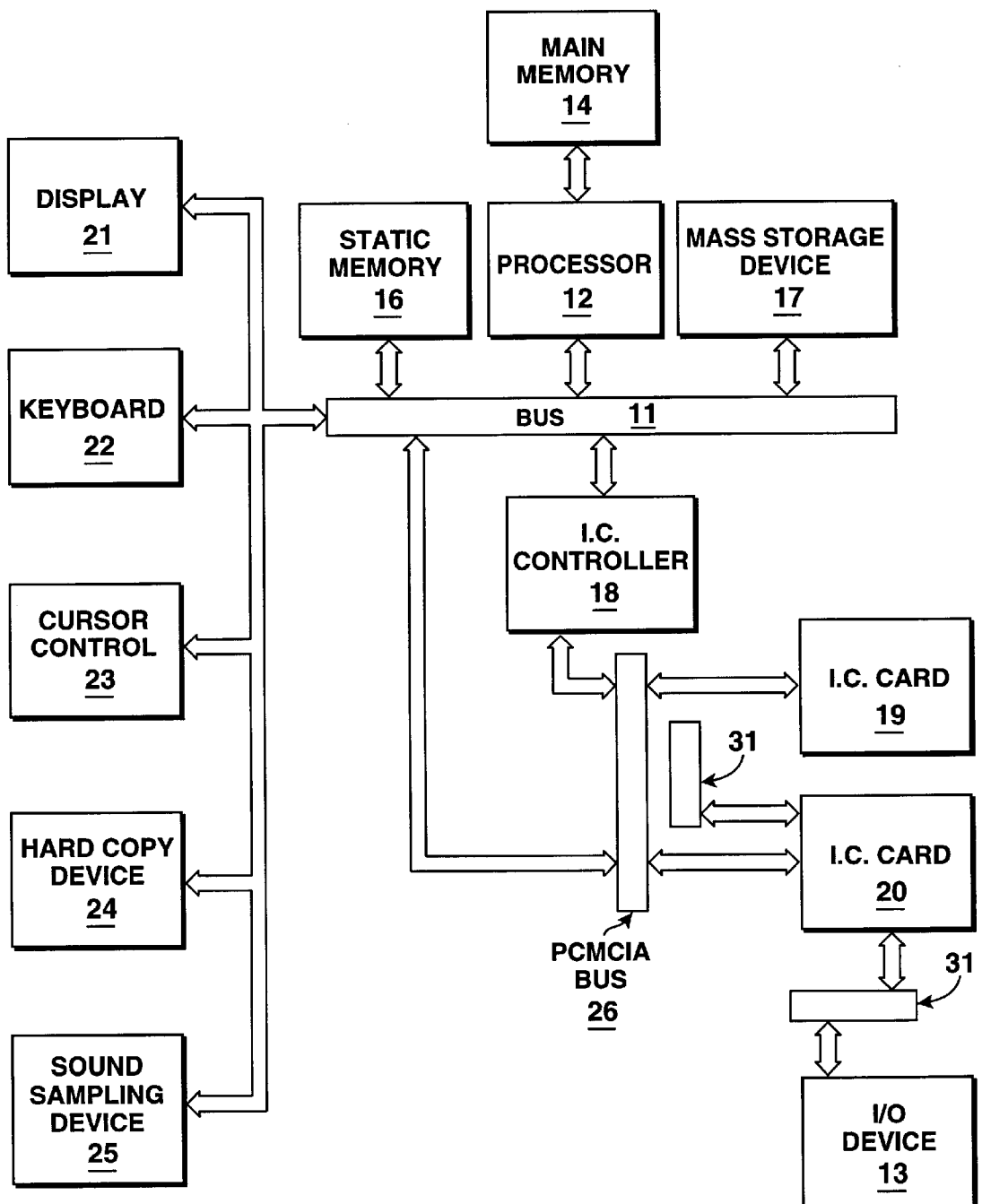
FIG. 1 illustrates a typical computer system in which the present invention operates.

As shown in FIG. 1, the computer system of the preferred embodiment includes a processor 12, which, as embodied herein is an Intel architecture microprocessor manufactured by the assignee of the present application, Intel Corporation of Santa Clara, Calif. The computer system of FIG. 1 may be compatible with the IBM™ PC AT Personal Computer, for example. The computer system of the preferred embodiment generally comprises a bus 11 for communicating information with the processor 12 coupled thereto. A random access memory (RAM) or other dynamic storage device 14 is coupled with the processing means 12 for storing information and instructions for the processor 12. A read only memory (ROM) or other non-volatile storage device 16 is coupled with the bus 11 for storing non-volatile information and instructions for the processor 12. Optionally, a data storage device 17, such as a magnetic disk or disk drive, is coupled with the bus 11 for storing information and instructions, and a display device 21, such as a cathode ray tube or liquid crystal display, is coupled to the bus 11 for displaying information to the computer user.

Additionally, an alphanumeric input device 22, such as a keyboard, including alphanumeric and other keys, is coupled to the bus 11 for communicating information and command selections to processor 12, and a cursor control 23 may be coupled to the bus 11 for controlling cursor movement. The computer system may further include a hard copy device 24, such as a plotter or printer, for providing visual representation of the computer images. The hard copy device 24 is coupled with the processor 12, the main memory 14, the non-volatile memory 16 and the mass storage device 17 through the bus 11. The computer system may also include a sound recording and playback device 25, which is coupled to the bus 11 for providing audio recording and playback.

Two IC cards 19 and 20 are coupled to the PCMCIA bus 26. The number of IC cards which may be coupled to the computer system may vary. In the preferred embodiment, IC cards 19 and 20 are PCMCIA cards, and the PCMCIA bus 26 is coupled to the bus 11 and to IC controller 18. The bus 26 is a standard PCMCIA bus for communicating information according to the PCMCIA standard between cards 19 and 20 and the remainder of the computer system. Although IC cards 19 and 20 and PCMCIA bus 26 are configured to communicate according to the PCMCIA standard, other interface types and configurations fall within the scope of the present invention. The IC controller 18 is coupled to bus 11 and provides control and address information to IC cards 19 and 20 via PCMCIA bus 26. It should be noted that each of the two IC cards 19 and 20 is not coupled to PCMCIA bus 26 until it is inserted into a slot in the side of the computer system. Upon such insertion, the 68-pin interface of the computer system is coupled to the 68-pin PCMCIA standard interface of the card.

A signal path or bus 31 (e.g., sideswipe contact bus) is connected to IC card 20 for communicating information to IC card 20 by other than its standard interface. In the preferred embodiment, the signal path/bus 31 may only transfer one signal, while in alternative embodiments, bus 31 provides a signal path for multiple signals. Additionally, bus 31 may be coupled to IC card 19. An input/output port or connector for the computer system is provided by input/output (I/O) device 13. The I/O device 13 is coupled to signal path/bus 31 for access to signals from IC card 20. In an alternative embodiment, I/O device 13 may also be coupled to bus 11 for communication with the remainder of the computer system. In an alternative embodiment, I/O device 13 comprises a jack or plug, such as an RJ11 jack, RJ45 jack or other proprietary or telephone port that is coupled to the PC chassis for input and output.

The I/O device 13 may also include an infra-red antenna or a radio-frequency antenna or other communications device. Although only one I/O device is shown, the computer system of the present invention may include multiple I/O devices and, additionally, these multiple I/O devices may be coupled to an IC card.

It will be apparent to those skilled in the art that other computer systems may be used with the present invention. Similarly, it will be apparent to those skilled in the art that the computer system illustrated in FIG. 1 may include additional components not illustrated in FIG. 1, may be configured without components that are illustrated in FIG. 1, or components may be coupled in different configurations.

Figure 2:
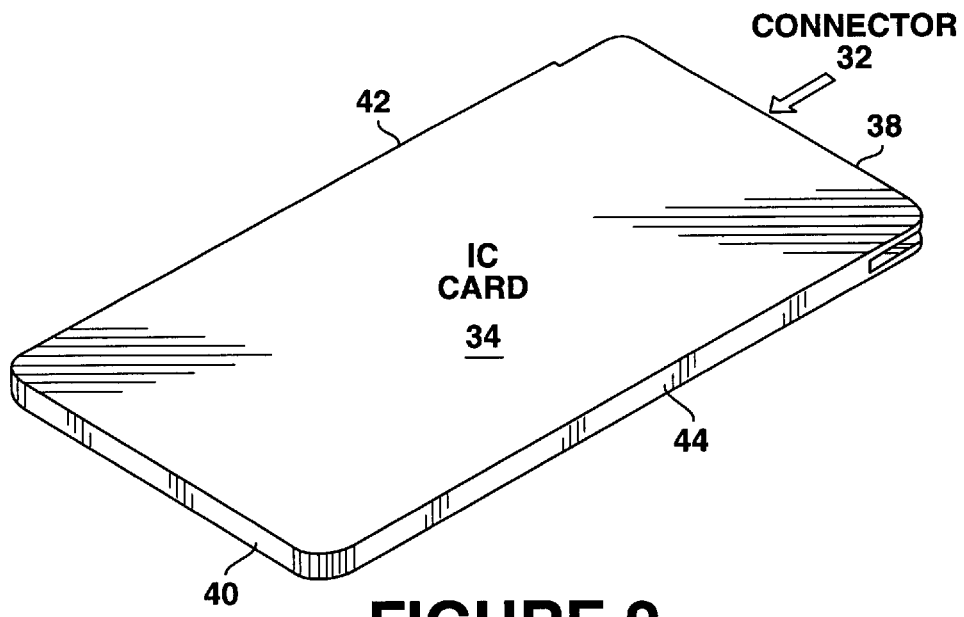
FIG. 2 illustrates the IC card of the preferred embodiment of the present invention.
Figure 3:
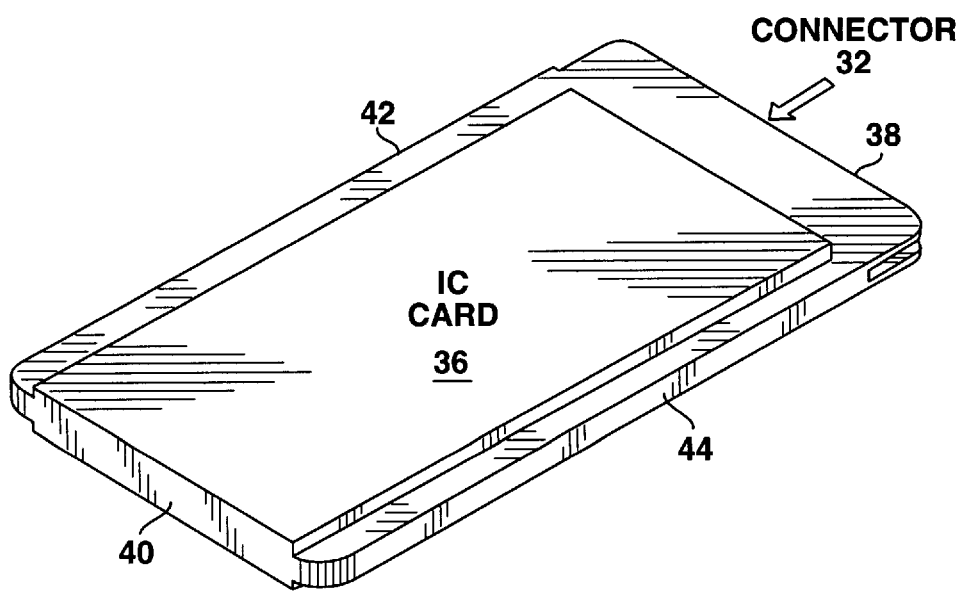
FIG. 3 illustrates an alternative embodiment of the IC card of the present invention.

Two embodiments of the IC card of the present invention are shown in FIGS. 2 and 3, respectively. In FIG. 2, an IC card 34, which is a Type I IC card according to the PCMCIA PC card 2.0 standard, is shown, and in FIG. 3, an IC card 36, which is a Type II IC card according to the PCMCIA PC card 2.0 standard, is shown. The present invention may also be used with Type III Type I Extended, or Type II Extended IC cards or IC cards according to future versions of the PCMCIA or JEIDA specification. Each IC card includes a frame which has front and back ends 38 and 40, respectively, and opposite sides 42 and 44, respectively.

Connector 32 is mounted at the front end of the frame and has multiple pin sockets for coupling the IC card to the computer system. In the preferred embodiment, connector 32 has 68 small sockets such that when either of the IC cards 34 and 36 is inserted into the slot in the computer, each of the sockets in connector 32 mates with one of 68 pins to provide an electrical connection. Connector 32 constitutes the standard interface of the IC card.

Mounted within the frame of each of the IC cards 34 and 36 is a circuit board assembly, which includes a circuit board having multiple circuit components mounted thereon. Each of the IC cards 34 and 36 provides an architecture for performing a designated function for the computer system. The IC card 34, for example, may include an architecture for providing the protocol and handshaking necessary to achieve a LAN hook-up between the computer system and a local area network. Another particular IC card, such as IC card 36, may provide an architecture for facsimile operations. Either of the IC cards 34 and 36 may include architecture for providing a variety of input/output functions, such as configurations for radio frequency or infrared communications. Moreover, either of the IC cards 34 and 36 may include architecture for providing an external hard drive, such as a solid state hard drive or a rotating disk. It will be apparent to one of ordinary skill in the art that the IC card may provide other types of functionality as well.

FIG. 2 shows an IC card 34 with a thickness height of 3.3 mm, a length of 85.60 mm, and a width of 10 cm. Referring to FIG. 3, the thickness of IC card 36 is 3.3 mm at the outer edges and 5 mm in the inner portion of the card. The length and width of IC card 36 are 85.6 mm and 10 mm, respectively. Note that although the dimensions for IC card 34 and IC card 36 are specified according to the PCMCIA 2.0 standard, other types of cards may be used with the present invention including cards manufactured to correspond to future versions of the PCMCIA standard. While each of the cards of the preferred embodiment only performs one function, the present invention is capable of operating with cards which perform multiple functions.

Figure 4:
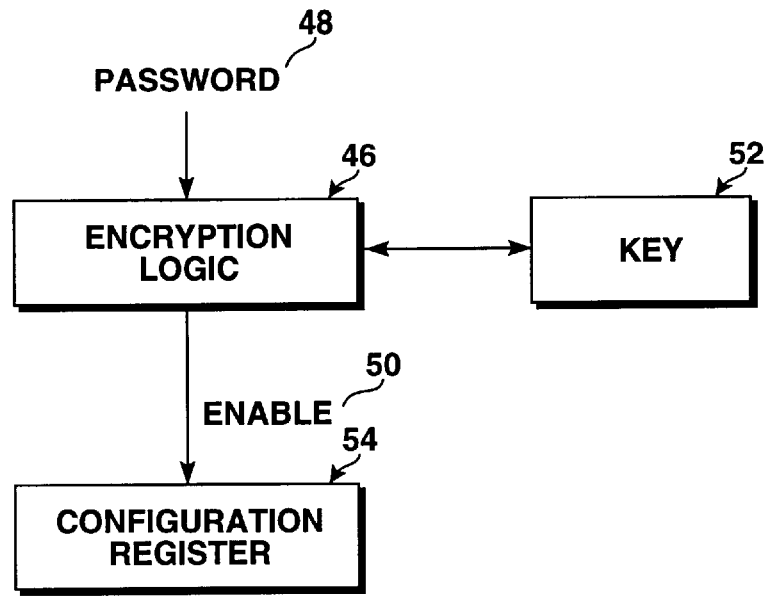
FIG. 4 illustrates the encryption logic of the preferred embodiment.

FIG. 4 illustrates the encryption logic 46 of the preferred embodiment. Encryption logic is used to encrypt an assigned password so that an unauthorized user can not easily detect the IC card password. The encryption logic 46, as with the other elements shown in FIG. 4, is preferably configured on the IC card itself. This, however, need not be the case. The encryption logic 46 may be implemented as hardware or identical functionality may be provided in software. "Two's complement" and simple "XOR'ing" are examples of well known encryption technologies. There are several other types of encryption logic available. It will be apparent to one of ordinary skill in the art that most any type of encryption logic may be employed as the encryption logic of the present invention.

In the preferred embodiment, each IC card has a code or "key" 52 which is "programmed" on the IC card during the manufacture of that IC card. According to the preferred embodiment, key 52 is a seven bit code which is initially set to all zeros to indicate that a password has not yet been assigned. For a more elaborate theft-prevention protocol, however, the key 52 may be a twenty-bit code, for example. Additionally, the key may be set to any sequence of digits initially or a unique key could be assigned to each IC card when it is manufactured.

The present invention further includes utility software that is shipped with the IC card or included with the computer system. The utility software may be on the IC card itself or provided separately for installation onto the computer system hard disk drive or other storage area. The utility software includes a user interface which displays prompts on the computer system monitor or other output device, requesting user input for password assignment, password entry, and other user-controllable features of the present invention.

Password 48 is assignable by the owner of the IC card upon initial installation and can be changed by the user at any time after supplying the last assigned password upon request. When the IC card is first installed, according to the preferred embodiment, all bits of the IC card key are zeros indicating that a password has not yet been assigned to the IC card. The utility software supplied with the IC card then prompts the user to input his or her desired password. The user inputs his or her password 48 via keyboard 22 (FIG. 1) or other input device. The encryption logic 46 then encrypts the assigned password 48 and stores the encrypted password as the key 52. The key 52 is used to determine, for subsequent uses of the IC card, whether to enable operation of the IC card based on the user-entered password.

After the password has been assigned initially, in subsequent use, after the IC card is inserted into the computer, the utility software will prompt the user to enter the assigned password. A user may input the password 48 to the encryption logic 46 using the keyboard 22 (FIG. 1) or other input device. After the user enters the password 48 via keyboard 22 or other input device, the encryption circuit 46 encrypts the password 48. The encryption circuit 46 then compares the encrypted password with the key 52. In the event of a match, an enable signal 50 is sent to configuration register 54, which, in the preferred embodiment, is always located on the IC card 54. The configuration register 54 is the register to which values are written in order to configure the IC card for operation. In the preferred embodiment, the configuration register 54 is an application-specific integrated circuit (ASIC). Accordingly, if the configuration register 54 does not receive an enable signal 50, the IC card cannot be operated.

Figure 5:
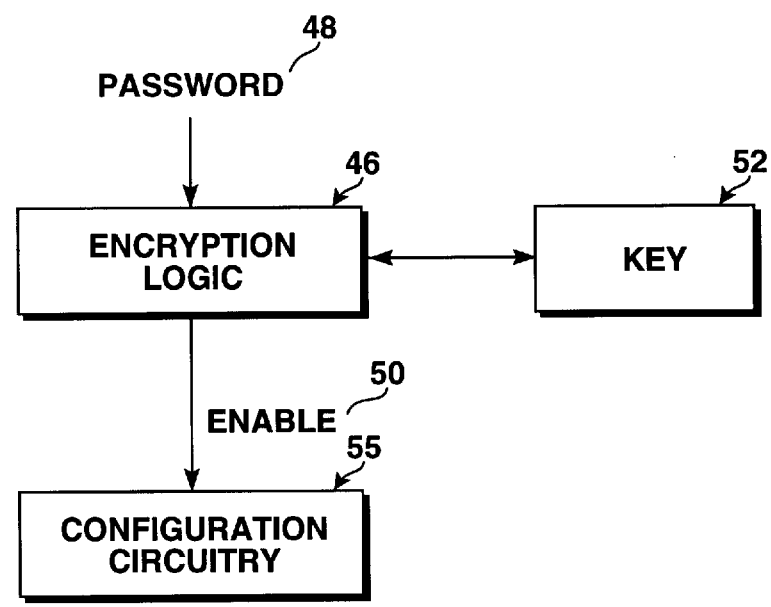
FIG. 5 illustrates the encryption logic of an alternative embodiment of the present invention.

An alternative embodiment of the present invention is shown in FIG. 5. In this embodiment, the enable signal 50 is not sent to the configuration register 54, but instead is sent to other enabling or configuration circuitry 55, such as a microcontroller, a RAM, or an ASIC. The enable signal 50 may also be sent to combinations of the configuration register 54, microcontroller, RAM, or ASIC or to a software equivalent of a configuration register.

In one embodiment of the present invention, the utility software which comes with the IC card provides an option wherein the user may disable the password-request operation. In this embodiment, the IC card may not always be protected from theft or use by an unauthorized person.

In another embodiment, which is applicable to an IC card for providing local area network (LAN) services, a higher security protocol may be incorporated. For example, if the IC card has the computer in a LAN connection, a user will not be able to communicate over the network without first entering the password 48. This embodiment may be especially useful in a highly confidential network having layers of protection such as passwords. In such a network, the present invention can provide an added layer of protection for enhanced security. In the similar case of a fax/modem IC card, a user may be prevented from sending or receiving information via the IC card without first entering the proper password 48.

Figure 6A:
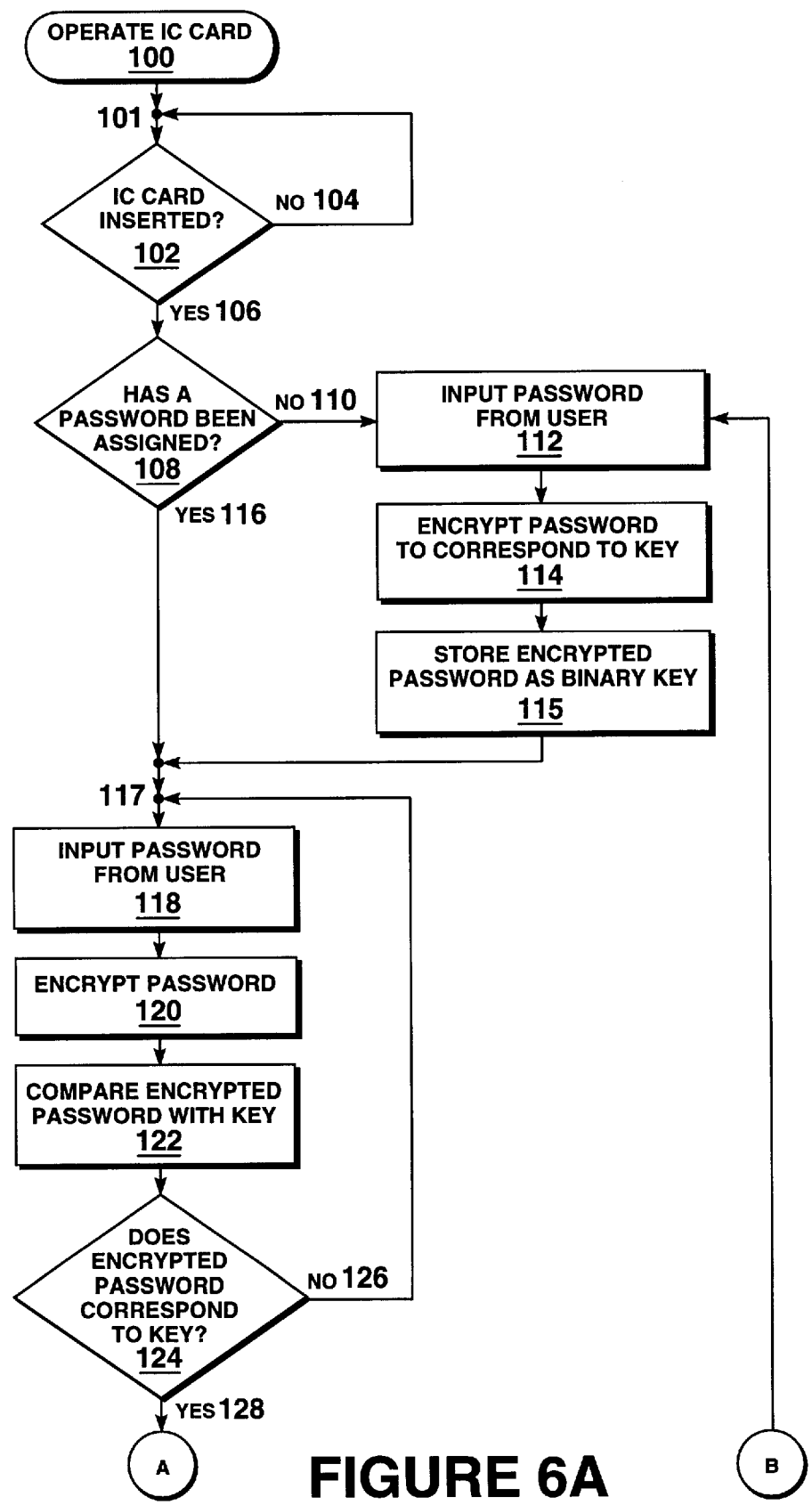
FIGS. 6A and 6B illustrate the method of the preferred embodiment.
Figure 6B:
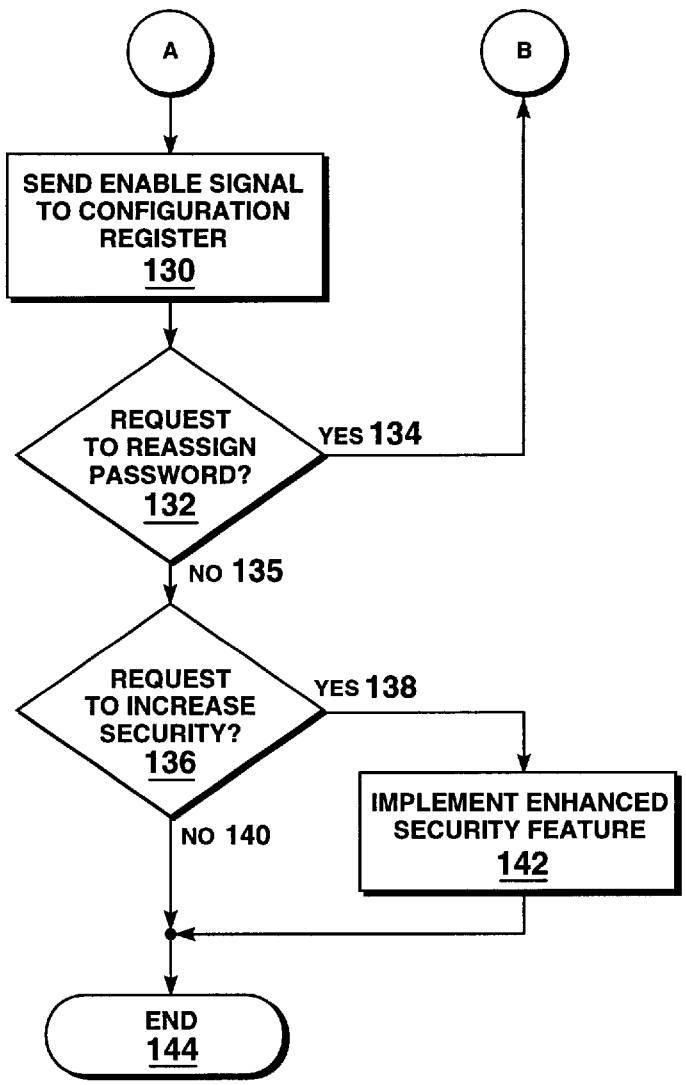

The method of the preferred embodiment is generally shown in FIG. 6A and FIG. 6B. After beginning at processing bubble 100, the method determines whether an IC card has been inserted into the computer at decision block 102. If this is not the case (processing path 104), then the method branches up to point 101. Assuming an IC card has been inserted into the computer (processing path 106), the method next determines at decision block 108 whether a password 48 (FIG. 4) has been assigned by the owner of the IC card.

If a password has not been assigned by the owner of the card (processing path 110) then the method allows the user to assign a password (processing block 112). This process may include the steps of prompting the user to enter a secret, self-assigned password, and requesting the user to reenter the password as a verification. After the user has successfully entered his or her password, the method encrypts the password at processing block 114 and stores the encrypted password as the key at processing block 115. The method then proceeds to processing block 118. Looking back to decision block 108, if a password has previously been assigned by a user (processing path 116), then the method also proceeds to processing block 118.

At processing block 118, according to the preferred embodiment, the method inputs the password 48 (FIG. 4) from the user. This procedure may include a prompt on the display, asking the user to enter his or her password in order to initiate operation of the IC card. The user may then input his or her password via keyboard 22 (FIG. 1) or other input device, for example. The method then encrypts the entered password at processing block 120 and compares the encrypted password with the key at processing block 122. A determination is made at decision block 124 as to whether the encrypted password corresponds to the key. If the encrypted password does not correspond to the key (processing path 126), then the method branches up to point 117, where the method allows the user another chance to input the correct password. In the preferred embodiment, two such branches to point 117 are allowed, thus allowing a total of three unsuccessful inputs. After the third unsuccessful attempt, the IC card will no longer respond and may self-destruct, sound a piercing alarm, introduce a virus into the computer system, or other security measures may be taken under the assumption that the IC card has been stolen. The utility software provided with the IC card allows the IC card user to adjust the number of unsuccessful attempts the IC card will allow before implementing these security measures.

If the encrypted password corresponds to the key (processing path 128), then an enable signal 50 (FIG. 4) is sent to the configuration register 54 or other enabling circuitry at processing block 130 (FIG. 6B). The IC card is then initialized and configured so that normal operations may be executed on the card. One such operation may be the processing of a request to reassign the password (decision block 132). Upon such a request (processing path 134), the method branches up to processing block 112, where the user may change his or her password.

In addition to checking for requests to reassign the password, the method is also able to receive requests to increase security (decision block 136). If such a request is received (processing path 138), the method implements enhanced security features (processing block 142), as were discussed above with reference to FIG. 4. For example, an enhanced security feature for a fax/modem IC card might require entry of a password before information may be sent or received over the modem.

At processing block 142, as mentioned above, the user may additionally opt to change the number of attempts available to a user for entering the correct password. The user may opt to change the number of attempts from three to an unlimited number of times, or may choose to limit the number of attempts to only one. At processing path 140, no request to increase security is received, but other conventional operations may occur, which are not discussed or shown. The method ends at processing bubble 144.

Thus, a method and apparatus for controlling access to detachably connectable computer devices using encryption are disclosed. Although the present invention is described herein with reference to a specific embodiment, many modifications and variations therein will readily occur to those of ordinary skill in the art. Accordingly, all such variations and modifications are included within the intended scope of the present invention as defined by the following claims. For example, while the above invention has been described in the context of notebook computers, the applicability of such a security system to IC cards in desktop computer systems is within the scope of the present invention as well.

Moreover, it will be apparent to those of ordinary skill in the art that the security system of the present invention may be applied to and thus provide theft protection for most any detachable computer device such as a computer battery, mouse, hard drive, floppy-disk drive, detachable screen, or keyboard.

For example, some portable computers have removable floppy-disk drives which can be replaced with batteries. With each of these above-mentioned components, a thief would not be able to operate the component without the password for that particular component.

Therefore, reference to the details of the preferred embodiment are not intended to limit the scope of the claims which themselves recite only those features regarded as essential to the invention.

We claim:

1. A network communications device which is detachably connectable to a computer system and which prevents unauthorized network communications, the network communications device comprising:

a network communications interface;

a password input to receive first and second passwords;

encryption logic coupled to the password input to encrypt the first and second passwords according to a same encryption routine;

a storage element coupled to the encryption logic to store the encrypted first password; and network communications enabling logic coupled to the encryption logic and to the storage element, the network communications enabling logic to enable network communications via the network communications interface only if the encrypted second password is the same as the encrypted first password.

2. The network communications device of claim 1 wherein the network is a local area network (LAN).

3. The network communications device of claim 1 wherein the network is a telephone network.

4. The network communications device of claim 1 further including logic to reconfigure the communications enabling logic such that network communications are enabled without requiring the encrypted second password to correspond to the encrypted first password.

5. A method for preventing unauthorized network communications over a network communications device, the network communications device being detachably connectable to a computer system, the method comprising the steps of:

encrypting a first password received by the network communications device using an encryption algorithm;

storing the encrypted first password on the network communications device;

encrypting a second password using the same encryption algorithm, the second Password being received by the network communications device after the first password;

comparing the encrypted second password to the encrypted first password; and the network communications device enabling network communications using the network communications device only if the encrypted second password matches the encrypted first password.

6. The method of claim 5 further including the following steps if the encrypted second password does not match the encrypted first password:

encrypting a third password received by the network communications device using the same encryption algorithm;

comparing the encrypted third password to the encrypted first password;

if the encrypted third password matches the encrypted first password, the network communications device enabling communications using the network communications device; and if the encrypted third password does not match the encrypted first password, the network communications device preventing communications using the network communications device.

7. The method of claim 5 wherein the network is a local area network.

8. The method of claim 5 wherein the network is a wide area network.

9. The method of claim 5 wherein the network is a telephone network.

10. A Personal Computer Memory Card International Association (PCMCIAI) communications card that prevents unauthorized communications using the PCMCIA communications card, the PCMCIA communications card comprising:

a network communications interface;

a password input to receive first and second passwords;

encryption logic coupled to the password input to encrypt the first and second passwords according to a predetermined encryption routine;

a storage element coupled to the encryption logic to store the encrypted first password; and network communications enabling logic coupled to the encryption logic and to the storage element, the network communications enabling logic to enable network communications via the PCMCIA communications card network communications interface only if the encrypted second password matches the stored, encrypted first password.

11. A computer system comprising:

a processor to process information;

a bus coupled to the processor to communicate information; and a PCMCIA network communications device. The PCMCIA network communications device being detachably coupled to the computer system, the PCMCIA network communications device comprising:

a network communications interface, a password input to receive first and second passwords from the computer system, encryption logic coupled to the password input to encrypt the first and second passwords according to an encryption algorithm, and network communications enabling logic coupled to the storage element and to the encryption logic, the network communications enabling logic enabling communications via the network communications interface if the encrypted second password matches the encrypted first password.

12. The computer system of claim 11 wherein the PCMCIA network communications device is a facsimile modem.

13. The computer system of claim 11 wherein the PCMCIA network communications device is a modem and the network communications interface is a telephone connector.

14. The computer system of claim 11 wherein the PCMCIA network communications device is a network access device and the network communications interface is a non-telephone network connector.

15. The computer system of claim 11 wherein if the encrypted second password does not match the encrypted first password, communications are prevented until a third password is received which when encrypted using the same encryption algorithm, matches the encrypted first password.

\* \* \* \* \*